May 10, 1927.

W. M. WILLY 1,627,627

REATOMIZING DEVICE FOR INTERNAL COMBUSTION ENGINES

Filed Jan. 12, 1926

INVENTOR.
Walter Milo Willy,
BY
Geo. P. Kimmel, ATTORNEY.

Patented May 10, 1927.

1,627,627

UNITED STATES PATENT OFFICE.

WALTER MILO WILLY, OF PUKWANA, SOUTH DAKOTA.

REATOMIZING DEVICE FOR INTERNAL-COMBUSTION ENGINES.

Application filed January 12, 1926. Serial No. 80,768.

This invention relates to a reatomizing device for internal combustion engines, and has for its object to provide, in a manner as hereinafter set forth, a device of the class aforesaid, for interposition in an intake manifold in proximity to a carbureter for arresting the heavier particles of gasoline carried by a combustible charge and combining a siphoning action such heavier particles in a more atomized state with the charge as the latter travels to the engine, thereby increasing the efficiency of the charge and reducing to a minimum the charge carrying heavier particles of gasoline into the combustion chamber of the engine, resulting in a more efficient operation of the latter as well as materially reducing the carbonizing of the wall of the combustion chamber.

Further objects of the invention are to provide, in a manner as hereinafter set forth, a reatomizing device for the purpose referred to, which is simple in its construction and arrangement, strong, durable, compact, thoroughly efficient in its use, readily installed with respect to the intake manifold of an internal combustion engine, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
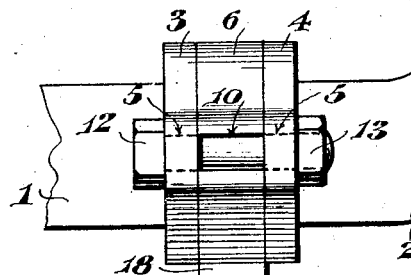
Figure 1 is an elevation of a reatomizing device in accordance with this invention, showing the adaptation thereof in connection with the intake manifold of an internal combustion engine.
Figure 4:
Figure 4 is a section on line 4—4, Figure 3.
Figure 2:
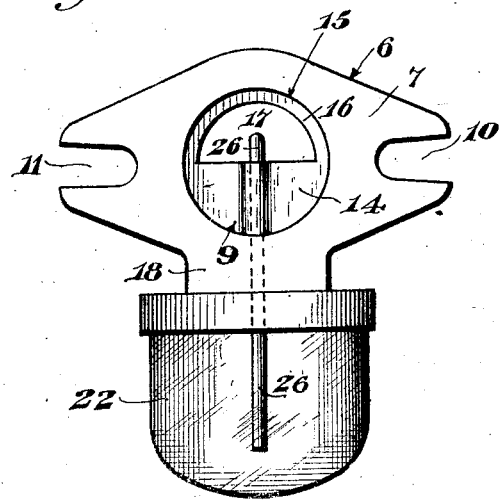
Figure 2 is an elevation of the device, removed from the intake manifold, and at right angles to the position shown in Figure 1.
Figure 3:
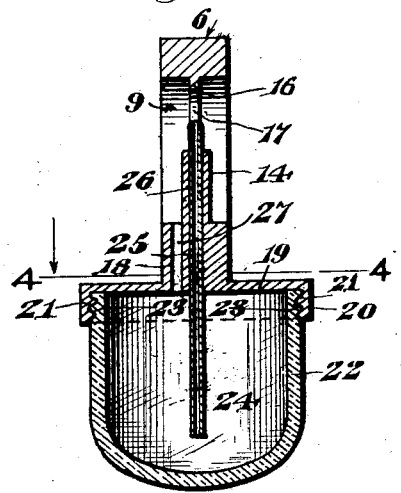
Figure 3 is a vertical sectional view of the device.

Referring to the drawings, 1 and 2 denote the sections of an intake manifold. The section 1 leads from the carbureter, not shown, to the device, and the section 2 extends from the attachment to the engine. The device is arranged in close proximity to the carbureter. The end of the section 1, which opposes the device, is provided with a flange 3, and that end of the section 2 which opposes the device is provided with a flange 4. The flanges 3, 4 project outwardly from the sections of the intake manifold, and each of said flanges, centrally of each side thereof, is formed with an opening 5. The openings of one flange align with the openings of the other flange.

A reatomizing device, in accordance with this invention, comprises a supporting member referred to generally by the reference character 6 and which consists of a head piece 7 of substantial thickness and which is of the same contour as the flanges 3, 4 and is adapted to be interposed between such flanges. The head piece 7 is formed centrally with an opening 9 having its wall registering with the inner face of the sections 1 and 2, so that said opening 9 will form a continuation of the intake passage provided by the sections 1 and 2 for the combustible charge. The head piece 7, at each end thereof, is slotted. The slots are oppositely disposed and indicated at 10, 11, and when the head piece 7 is interposed between the flanges 3 and 4, a slot registers with a pair of aligning openings 5. The head piece 7 is secured between the sections 1 and 2 of the intake manifold by a pair of hold-fast devices, only one of which is shown, and each hold-fast device consists of a headed bolt 12 and a securing nut 13. The bolt 12 extends through the opening 5 in the flange 3 and also through and projects from the opening 5 in the flange 4. The bolt 12 also extends through a slot 10 or 11. The head of the bolt abuts against the outer face of the flange 3, and the securing nut 13 is mounted on the bolt 12 and abuts against the outer face of the flange 4. It will be stated, however, that the position of the head of the bolt 12 and nut 13 can be reversed with respect to the flanges 3, 4.

The head piece 7 is further provided with an upstanding semi-circular baffle 14 of appropriate thickness, which is formed integral with and centrally of the lower part of the wall 15 of the opening 9. The head piece 7 is furthermore provided with a depending semi-circular narrow flange 16, which is formed integral with and centrally of the upper part of the wall of the opening 15 and is of the same thickness as the thickness of the baffle 14. The flange 16, at its lower end, merges into the top edge of the baffle 14, and the latter in connection with the former provides a semi-circular opening 17 for the passage of the combustible charge into the section 2 of the intake manifold.

Formed integral with the head piece 7, centrally of the bottom thereof, is a vertically disposed arm 18 of rectangular contour, and which is of less length than the length of the head piece 7. The arm 18 merges into a circular cap member 19, which is formed with a depending annular flange 20, provided throughout with interior teeth 21. Detachably connected with the flange 20 of the cap member 19, as well as being closed by said cap member is a depending bowl 22 formed of transparent material. The outer periphery of the bowl 22, at the top thereof is provided with peripheral threads 23 for engagement with the threads 21 of the flange 20. The bowl 22 provides a collecting chamber 24 for the heavier particles of gasoline.

The supporting member 6 furthermore includes a vertically disposed opening 25, which extends through the baffle 14, the lower portion of the head piece 7, the arm 18 and the cap member 19. The opening 25 is centrally disposed with respect to said baffle, head piece, arm and cap member. Fixedly secured within the opening 25, depending into the chamber 24 to near the bottom thereof, and further extending above the opening 25 and into the opening 17 is a siphoning tube 26. The supporting member 6 is furthermore provided with an inlet passage 27 for the chamber 24 and said passage is arranged forwardly with respect to the siphoning tube 26. The passage 27 extends through the lower portion of the head piece 7, through the arm 18 and also through the cap member 19. The passage 27, at its upper end, communicates with the opening 9 directly in advance of the lower portion of the baffle 14. The passage 27 is narrow elongated and rectangular in contour and opens at its lower end into the top of the chamber 24 forwardly of the siphoning tube 26.

As the charge leaves the carbureter it passes into the section 1 of the intake manifold, from there into the opening 9 and heavier particles of the gasoline are arrested by the baffle 14, and certain of such particles are also arrested by the flange 16. The said arrested heavier particles of gasoline pass through the passage 27 into the collecting chamber 24 to the bottom thereof and owing to the suction action of the charge as it passes through the opening 17, a siphoning action is set up and such action will draw the collected gasoline from the chamber 24 up through the tube 26 from which it will be discharged in a more atomized condition into the combustible charge, or in other words, the action of the combustible charge as it travels through the opening 9, will take up the gasoline from the chamber 24 in a more atomized condition, thereby increasing the efficiency of the charge.

It is thought the many advantages of a reatomizing device, in accordance with this invention, for internal combustion engines, can be readily understood, and although the preferred embodiment of the invention is as illustrated and described, yet it is to be understood that changes in the details of construction can be had which will fall within the scope of the invention as claimed.

What I claim is:—

1. A reatomizing device for internal combustion engines comprising a head piece formed with an opening communicating with the intake manifold of the engine, a bowl suspended from said member and closed thereby, a baffle carried by said member and extending partly across said opening at the lower portion thereof and providing means for arresting heavier particles of gasoline, said head piece provided with means for discharging said heavier particles into said bowl, a siphoning tube leading from a point within and in proximity to the bottom of said bowl to said opening for directing the gasoline from the bowl in a reatomized state into the combustible charge as the latter travels through said opening, and a semi-circular flange carried by said member and arranged above said baffle.

2. A reatomizing device for internal combustion engines comprising a head piece for interposition in the intake manifold of the engine and formed with an opening for the passage of a combustible charge, a semi-circular baffle secured within the lower portion of said opening and spaced from the forward face of the head piece, a collector suspended from said head piece, said head piece formed with a vertical passage opening at its top forwardly of said baffle, the latter in connection with said passage providing means for directing heavy particles of gasoline into said collector from the charge passing through said opening, and a siphoning tube extending from a point within and in proximity to the bottom of said collector through and to a point above said baffle and providing means in connection with the charge during the operation of the engine to set up a siphoning action to direct the collected heavier particles of gasoline in a reatomized state from the collector to admix with the charge travelling through said opening above the baffle.

3. A reatomizing device for internal combustion engines, comprising a head piece for interposition in the intake manifold of the engine and formed with an opening for the passage of a combustible charge, a semi-circular baffle secured within the lower portion of said opening, a collector suspended from said head piece, said head piece formed with a verticle passage forwardly of said baffle and the latter in connection with said passage providing means for directing heavy particles of gasoline into said collector from the charge passing through said opening, a siphoning tube extending from a point within and in proximity to the bottom of said collector through and to a point above said baffle, said tube providing means in connection with the charge to direct the collected heavier particles of gasoline in a reatomized state from the collector to admix with the charge travelling through said opening, and a semi-circular flange arranged on the wall of said opening, positioned over said baffle and having its lower ends merging into the top of the baffle.

4. A reatomizing device for internal combustion engines comprising a head piece for interposition in the intake manifold of an engine and formed with an opening for the passage of a combustible charge, a vertically disposed arm of rectangular contour formed integral with said head piece centrally of the bottom thereof, a collector suspended from said arm, a baffle positioned in the lower portion of said opening, said head piece and arm formed with a passage forwardly of said baffle for establishing communication between said opening and the collector for the passage of heavy particles of gasoline into the collector in proximity to the bottom of the latter, and a tube extending through said baffle, the lower part of said head piece and through said arm and opening at its lower end into said collector, said tube arranged rearwardly of said passage and providing in connection with the charge during the operation of the engine, a siphoning action to direct the collected heavy particles of gasoline in a reatomized state to admix with the charge travelling through said opening above the baffle.

5. A reatomizing device for internal combustion engines comprising a head piece for interposition in the intake manifold of an engine and formed with an opening for the passage of a combustible charge, a vertically disposed arm of rectangular contour formed integral with said head piece centrally of the bottom thereof, a collector suspended from said arm, a baffle positioned in the lower portion of said opening, said head piece and arm formed with a passage forwardly of said baffle for establishing communication between said opening and the collector for the passage of heavy particles of gasoline into the collector, a tube extending through said arm and opening at its lower end into said collector in proximity to the bottom of the latter, said tube arranged rearwardly of said passage and providing in connection with the charge during the operation of the engine, a siphoning action to direct the collected heavy particles of gasoline in a reatomized state to admix with the charge travelling through said opening above the baffle, and a semi-circular flange arranged within said opening, positioned over said baffle and having its lower ends merging into the top of the latter.

In testimony whereof, I affix my signature hereto.

WALTER MILO WILLY.